(12) United States Patent
Yan et al.

(10) Patent No.: US 12,215,444 B2
(45) Date of Patent: Feb. 4, 2025

(54) SAFETY AIRBAG MESH

(71) Applicant: JIAXING NIUDA TECHNOLOGY CO., LTD., Zhejiang (CN)

(72) Inventors: Huicheng Yan, Jiaxing (CN); Ronghua Wu, Jiaxing (CN)

(73) Assignee: JIAXING NIUDA TECHNOLOGY CO., LTD., Jiaxing (CN)

( * ) Notice: Subject to any disclaimer, the term of this patent is extended or adjusted under 35 U.S.C. 154(b) by 70 days.

(21) Appl. No.: 18/020,379

(22) PCT Filed: Aug. 25, 2021

(86) PCT No.: PCT/CN2021/114456
§ 371 (c)(1),
(2) Date: Feb. 8, 2023

(87) PCT Pub. No.: WO2022/205752
PCT Pub. Date: Oct. 6, 2022

(65) Prior Publication Data
US 2023/0272561 A1    Aug. 31, 2023

(30) Foreign Application Priority Data
Mar. 29, 2021 (CN) .......................... 202110329610.6

(51) Int. Cl.
*B60R 21/231* (2011.01)
*D03D 1/02* (2006.01)
(Continued)

(52) U.S. Cl.
CPC ............... *D03D 1/02* (2013.01); *D03D 9/00* (2013.01); *D03D 13/004* (2013.01);
(Continued)

(58) Field of Classification Search
CPC .......... D03D 1/02; D03D 9/00; D03D 13/004; D03D 15/267; D03D 15/275;
(Continued)

(56) References Cited

U.S. PATENT DOCUMENTS

| | | | | |
|---|---|---|---|---|
| 5,275,434 A | * | 1/1994 | Hirabayashi | ............. D03D 1/02 139/389 |
| 5,637,114 A | * | 6/1997 | Hohnke | ................... D03D 1/02 139/389 |

(Continued)

FOREIGN PATENT DOCUMENTS

| | | |
|---|---|---|
| CN | 101189375 A | 5/2008 |
| CN | 101356081 A | 1/2009 |

(Continued)

OTHER PUBLICATIONS

Jan. 4, 2022 International Search Report issued in International Patent Application No. PCT/CN2021/114456.

(Continued)

*Primary Examiner* — Robert H Muromoto, Jr.
(74) *Attorney, Agent, or Firm* — Oliff PLC

(57) ABSTRACT

A safety airbag mesh, which includes a fiber layer. The fiber layer includes a warp fiber unit that extends warpwise and a weft fiber unit that extends weftwise, characterized in that the warp fiber unit includes a plurality of first fibers and second fibers arranged weftwise. The first fibers warpwise cover a buffer area and a support area, and the first fibers in the buffer area take on nonlinear formation, and extend longer than the second fibers in the area.

10 Claims, 5 Drawing Sheets

(51) Int. Cl.
*D03D 9/00* (2006.01)
*D03D 13/00* (2006.01)
*D03D 15/267* (2021.01)
*D03D 15/275* (2021.01)
*D03D 15/283* (2021.01)
*B60R 21/205* (2011.01)

(52) U.S. Cl.
CPC ......... *D03D 15/267* (2021.01); *D03D 15/275* (2021.01); *D03D 15/283* (2021.01); *B60R 21/205* (2013.01); *D10B 2401/063* (2013.01); *D10B 2505/124* (2013.01)

(58) Field of Classification Search
CPC .... D03D 15/283; D03D 15/00; B60R 21/205; B60R 2013/0287; B60R 13/0256; D10B 2401/063; D10B 2505/124; D10B 2101/06; D10B 2101/12; D10B 2331/02; D10B 2331/04; D10B 2331/021
See application file for complete search history.

(56) References Cited

U.S. PATENT DOCUMENTS

| | | | | |
|---|---|---|---|---|
| 6,248,418 | B1 * | 6/2001 | Taguchi | D01F 6/62 2/268 |
| 6,830,261 | B2 * | 12/2004 | Sollars, Jr. | D03D 1/02 280/743.1 |
| 2002/0106957 | A1 * | 8/2002 | Ritter | D03D 3/02 442/76 |
| 2006/0019561 | A1 * | 1/2006 | Schindzielorz | B60R 21/235 442/76 |
| 2008/0014394 | A1 * | 1/2008 | Berger | D03D 1/02 428/36.1 |
| 2013/0106081 | A1 * | 5/2013 | Kim | D06N 3/0036 280/730.2 |

FOREIGN PATENT DOCUMENTS

| | | | |
|---|---|---|---|
| CN | 204080276 U | 1/2015 | |
| CN | 104627111 B * | 6/2017 | ......... B60R 21/2165 |
| CN | 108136990 A * | 6/2018 | ........... B60R 21/232 |
| CN | 109554802 A | 4/2019 | |
| CN | 209079401 U | 7/2019 | |
| CN | 112941694 A | 6/2021 | |
| EP | 2 221 405 A1 | 8/2010 | |

OTHER PUBLICATIONS

Jan. 4, 2022 Written Opinion of the International Searching Authority issued in International Patent Application No. PCT/CN2021/114456.

* cited by examiner

A

SAFETY AIRBAG MESH

FIELD OF THE INVENTION

The invention relates to the field of safety airbags, more particular, a safety airbag mesh.

BACKGROUND OF THE INVENTION

The front passenger airbag is mounted below the automotive dashboard. As airbag mounting points pop open in a collision, the airbag pops open from the inside of the dashboard, inflating to protect the front passenger. Therefore, the dashboard shall be opened neatly with no plastic fragments popping out to avoid personal injury.

Likewise, as people are increasingly demanding on safety, all automotive airbags, such as steering wheel airbags, side airbags and knee airbags, are required to cause no plastic fragments to pop out.

In view of this, it is desirable that a mesh structure can prevent the splash of sundries in the dashboard when an automotive safety airbag is opened.

SUMMARY OF THE INVENTION

To remedy defects of the prior art, the invention discloses a safety airbag mesh that can address the problem of the splash of sundries in the dashboard when an automotive safety airbag is opened, thereby ensuring the safety of the airbag user.

To this end, the invention discloses the following technical scheme: a safety airbag mesh, comprising a fiber layer. The fiber layer comprises of a warp fiber unit that extends warpwise and a weft fiber unit that extends weftwise, characterized in that the warp fiber unit comprises a plurality of first fibers and second fibers arranged weftwise, the first fibers warpwise cover a buffer area and a support area, the first fibers in the buffer area take on nonlinear formation, and extend longer than second fibers in the area.

The invention discloses a mesh wrapping up an automotive dashboard airbag frame. When the safety airbag is opened, the mesh acts as a buffer to prevent the splash of fragments arising out of the dashboard broken away from the mesh from causing any damage to the user. To be specific, when the airbag is opened, the first fibers in the buffer area are stretched from nonlinear formation at first to linear formation, in an attempt to buffer and prevent the broken dashboard from breaking away from the mesh.

Further, the safety airbag mesh disclosed in the invention also comprises a weft fiber wire. The weft fiber wire is arranged in the buffer area and connected to all the first fibers arranged weftwise in proper sequence.

In actual production, fibers in the buffer area are required of hot pressing and leveling, and the first fibers and the second fibers with their own coiling stress are not neatly arranged in the buffer area in consequence of fuzzing, thus the first fibers and the second fibers may overlay each other amidst hot pressing and leveling, which is indicative of problems of irregularity and inadequate flatness.

Therefore, to yield more preferable technical effects, a weft fiber wire is arranged to tidy the first fibers in the buffer area, making all the first fibers levelly arranged in proper sequence along the same direction in the buffer area.

Further, one weft fiber wire is arranged, the first fibers take on a triangle formation in the buffer area, and a plurality of first fibers are arranged weftwise in proper sequence in the buffer area.

Further, n weft fiber wires are arranged, wherein n is a positive integer that is greater than or equal to 2, and n weft fiber wires cause the first fibers to take on a polygonal formation in the buffer area.

Further, the weft fiber wire and the first fibers are securely woven together.

Alternatively, the weft fiber wire and the first fibers are securely spliced together.

Further, the first fibers should have greater tensile strength than that of the second fibers and the weft fiber wire.

Further, the first fibers comprise two or more bunches of interwoven fibers.

Further, the first fibers are made up of aromatic polyamide fibers, polyester fibers, nylon fibers, carbon fibers, or glass fibers, individually or in combination.

Further, the second fibers are made up of aromatic polyamide fibers, polyester fibers, nylon fibers, carbon fibers, or glass fibers, individually or in combination.

Further, the weft fiber wire is made up of aromatic polyamide fibers, polyester fiber, nylon fibers, carbon fibers, or glass fibers, individually or in combination.

In relation to the prior art, the invention has the advantage of ironing out the problem of the splash of sundries in the dashboard when an automotive safety airbag is opened, thereby ensuring the safety of airbag users.

Further, the invention has the advantage that during production, the weft fiber wire mounted in the buffer area is securely connected with the first fibers in the buffer area in proper sequence, making all the first fibers take on a regular level formation in the buffer area instead of overlaying each other in the buffer area, and when the airbag pops open, the weft fiber wire and second fibers may fracture without prejudice to the opening in the buffer area.

REFERENCE NUMERALS

1. Support area; 2. Buffer area; 3. Warp fiber unit; 31. First fibers; 32. Second fibers; 4. Weft fiber unit; 5. Weft fiber wire.

DETAILED DESCRIPTION OF THE INVENTION

By reference to FIGS. 1-5, what follows is a further description of the embodiment of the safety airbag mesh of the invention.

In the description of the invention, it should be noted that for nouns of locality, terms that indicate directions or locations, such as "central", "horizontal (X)", "longitudinal (Y)", "vertical (Z)", "length", "width", "thickness", "up", "down", "front", "rear", "left", "right", "upright", "level", "top", "bottom", "inside", "outside", "clockwise", and "anticlockwise", are based on directions or locations represented in figures, which are used for giving a brief description to the invention only, instead of indicating or implying that relevant devices or elements must be in specific directions, be structured or operated in specific directions. And the terms shall not be defined to restrict the specific scope of protection of the invention.

Besides, terms, such as "first" and "second", are for descriptive purposes only, which cannot be defined to indicate or imply relative significance or imply quantity that specifies any technical characteristics. Thus, those defining such characteristics as "first" and "second" may indicate or imply one or more characteristics of the like. In the description of the invention, "a couple of" and "a plurality of" indicate two or more, unless otherwise specified.

The safety airbag mesh comprises a fiber layer. The fiber layer is composed of a warp fiber unit that extends warpwise and a weft fiber unit that extends weftwise. The warp fiber unit comprises a plurality of first fibers and second fibers arranged weftwise. The first fibers warpwise cover a buffer area and a support area. The first fibers in the buffer area take on nonlinear formation. The first fibers in the buffer area extend longer than the second fibers in the area. The fiber layer also comprises a weft fiber wire. The weft fiber wire is arranged in the buffer area and connected to all the first fibers arranged weftwise in proper sequence.

Figure 1:
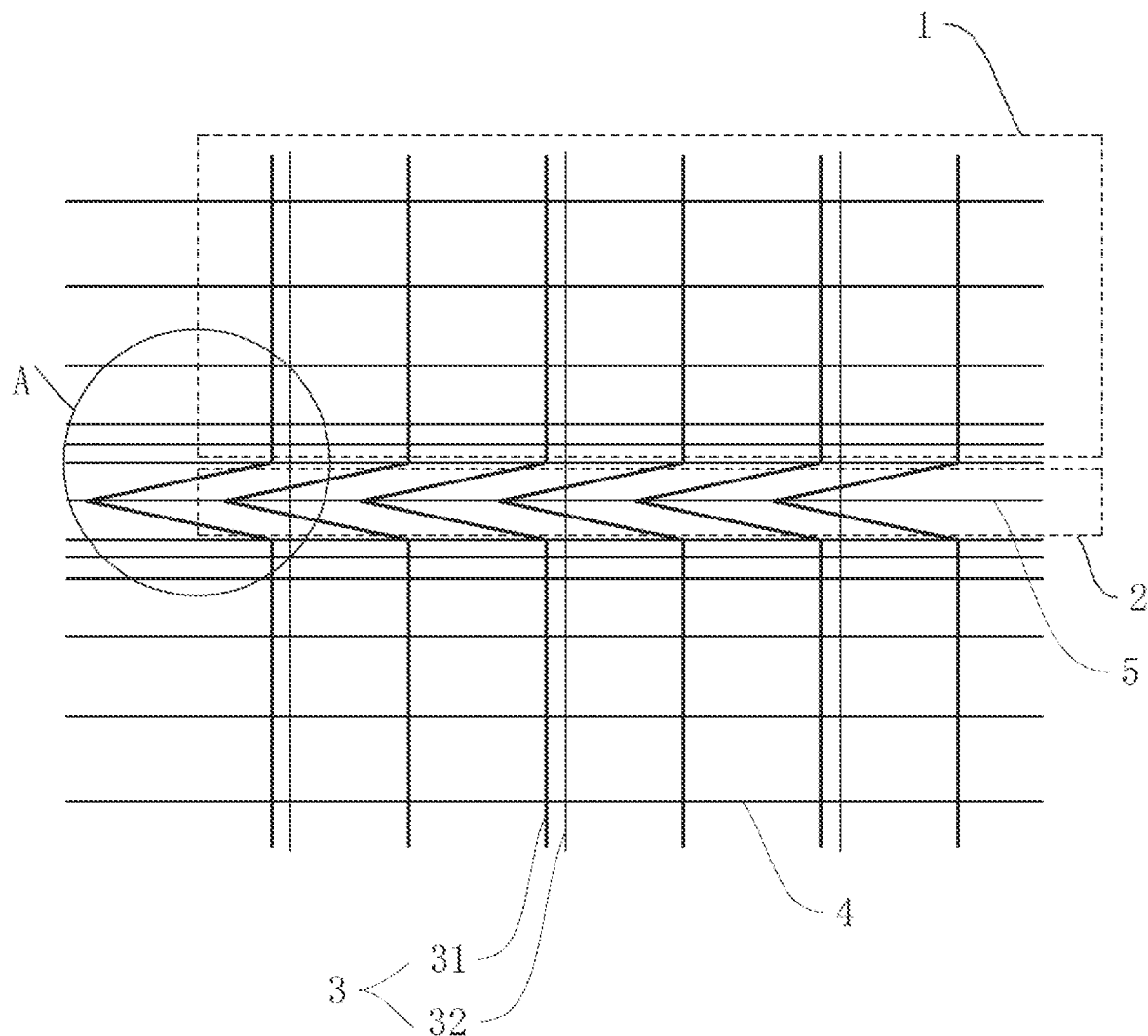
FIG. 1 is a structural schematic of the safety airbag mesh disclosed in the invention (with the airbag not popping open)
Figure 2:
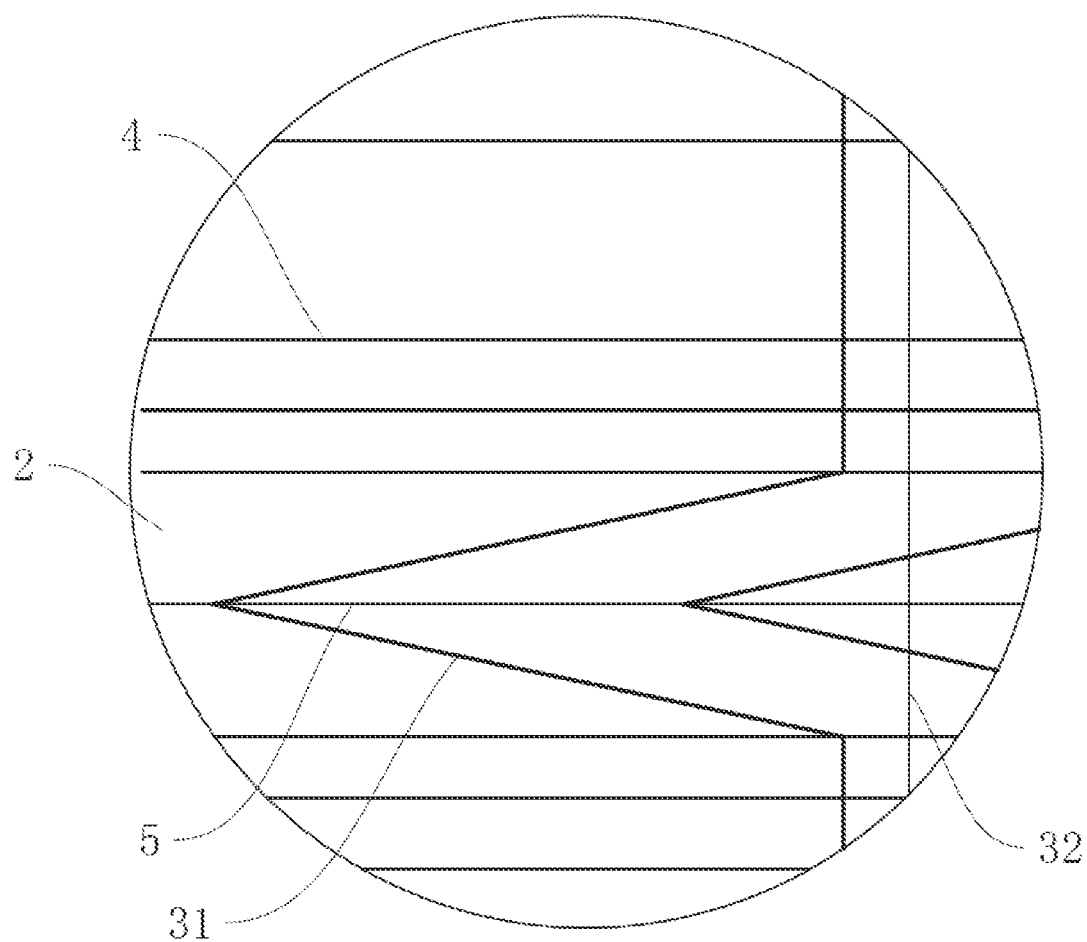
FIG. 2 is an enlarged view of Section A in FIG. 1.

As shown in FIGS. 1 and 2, for the invention, the support area 1 is arranged at both sides of buffer area 2, with a breadth of each support area subject to the length of the second fibers 32 in the buffer area, when the first fibers 31 in the buffer area shall extend longer than that of the second fibers 32 in the area.

Moreover, the weft fiber unit of the invention may also comprise third fibers woven with the first fibers and second fibers in the support area, so as to secure the structural strength of the support area with no loosening.

Furthermore, the invention may be arranged with the weft fiber wire 5 as well. In FIG. 1, there is one weft fiber wire 5 arranged, which draws all the first fibers 31 from the center to the left shown in FIG. 1. Alternatively in other embodiments, the weft fiber wire 5 may draw all the first fibers 31 from the center to the right shown in FIG. 1. So long as the drawing direction may be vertical to the weft or slightly inclined towards the weft or warp on the plane of the fiber layer, making the first fibers 31 will take on a triangular formation in the buffer area, a plurality of first fibers 31 arranged weftwise will levelly take on a regular formation in the buffer area, instead of overlaying each other.

Figure 3:
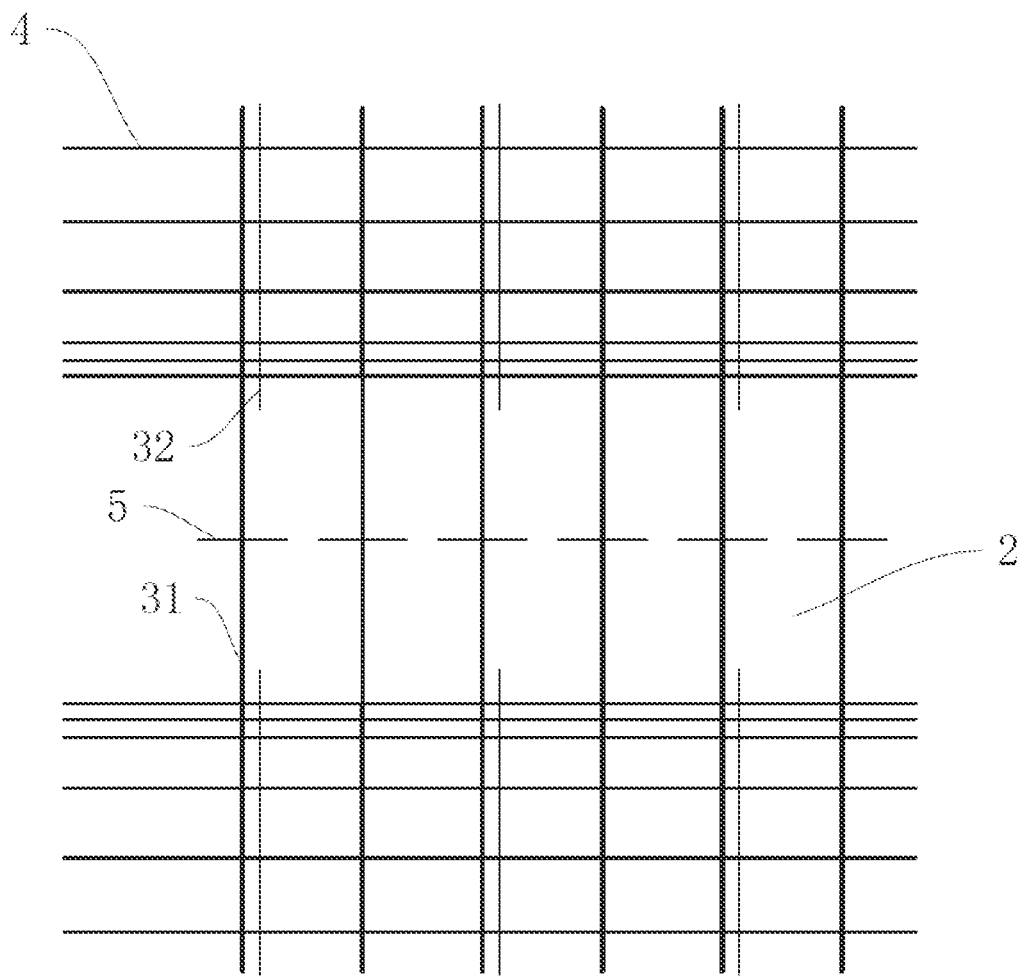
FIG. 3 is a structural schematic of the safety airbag mesh disclosed in the invention (with the airbag popping open)

As shown in FIG. 3, when the airbag pops open, the second fibers 32 will be snapped, and so will the weft fiber wire 5, making the first fibers 31 in the buffer area successfully drawn open.

In the invention, the first fibers 31 have greater tensile strength than that of the second fibers 32 and the weft fiber wire 5.

The first fibers 31 may be in a single bundle of fibers or two or more bundles of interwoven fibers, for avoiding splash of plastic fragments with greater tensile strength.

In practical use, a plurality of the first fibers may be arranged at the same time, e.g., two bundles of fibers and three bundles of fibers in an alternate arrangement, or arrangements of the like.

Preferably in the embodiment, the weft fiber wire 5 is securely woven together with the first fibers 31. For instance, the weft fiber wire may be woven in the fiber layer with the overlap between the weft fiber wire and the first fibers secured, so that the weft fiber wire as drawn can draw the first fibers altogether to straighten the first fibers.

In another embodiment, the weft fiber wire 5 may also be securely spliced with the first fibers 31 by glue or hot melting.

Preferably in the embodiment, the first fibers are made up of aromatic polyamide fibers, polyester fibers, nylon fibers, carbon fibers, or glass fibers, individually or in combination.

Further preferably, the second fibers are made up of aromatic polyamide fibers, polyester fiber, nylon fibers, carbon fibers, or glass fibers, individually or in combination.

Further preferably, the weft fiber wire is made up of aromatic polyamide fibers, polyester fiber, nylon fibers, carbon fibers, or glass fibers, individually or in combination.

In alternative embodiments, n weft fiber wires are arranged, wherein n is a positive integer that is greater than or equal to 2, and n weft fiber wires cause the first fibers to take on a polygonal formation in the buffer area.

Figure 4:
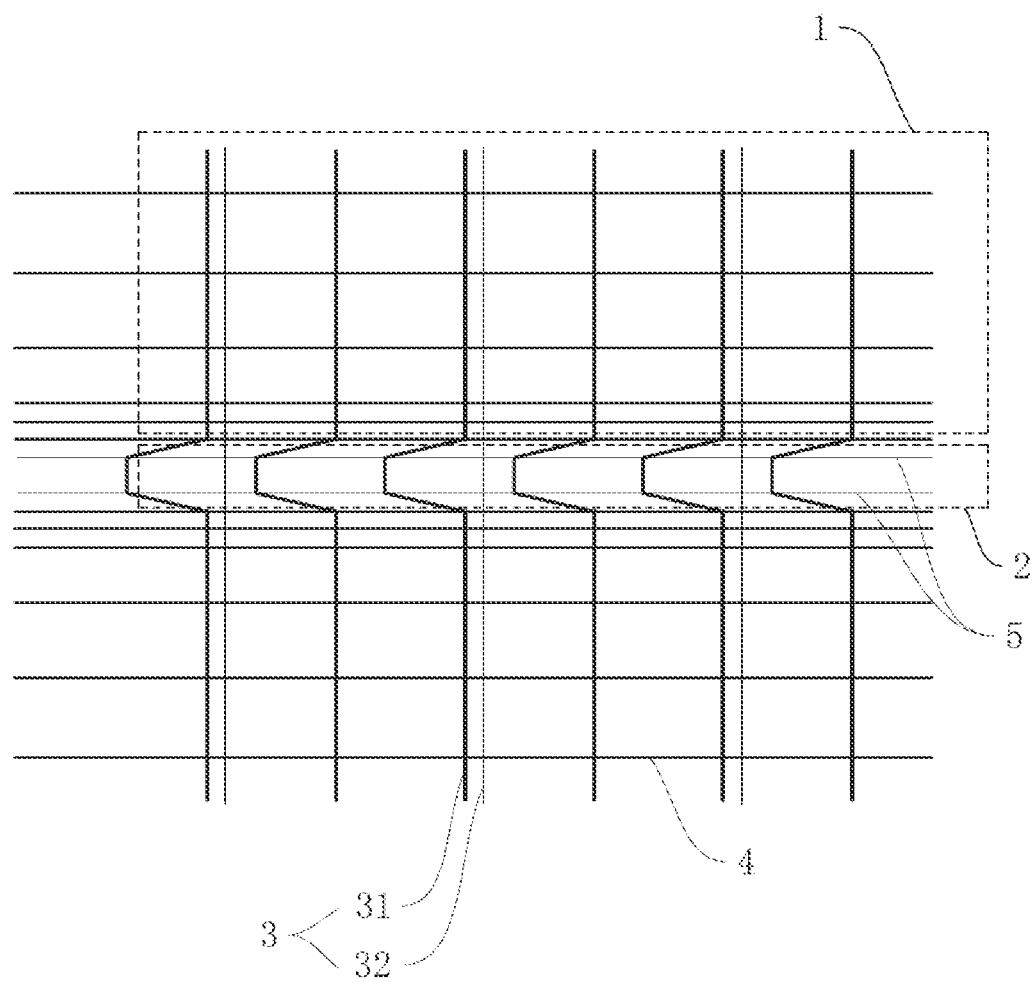
FIG. 4 is a structural schematic of the safety airbag mesh (with two weft fiber wires arranged in the same direction)

For instance, as shown in FIG. 4, there are two weft fiber wires 5 arranged, both of which draw leftward the first fibers 31 in the buffer area, making the first fibers 31 take on a trapezoidal formation in the buffer area.

Figure 5:
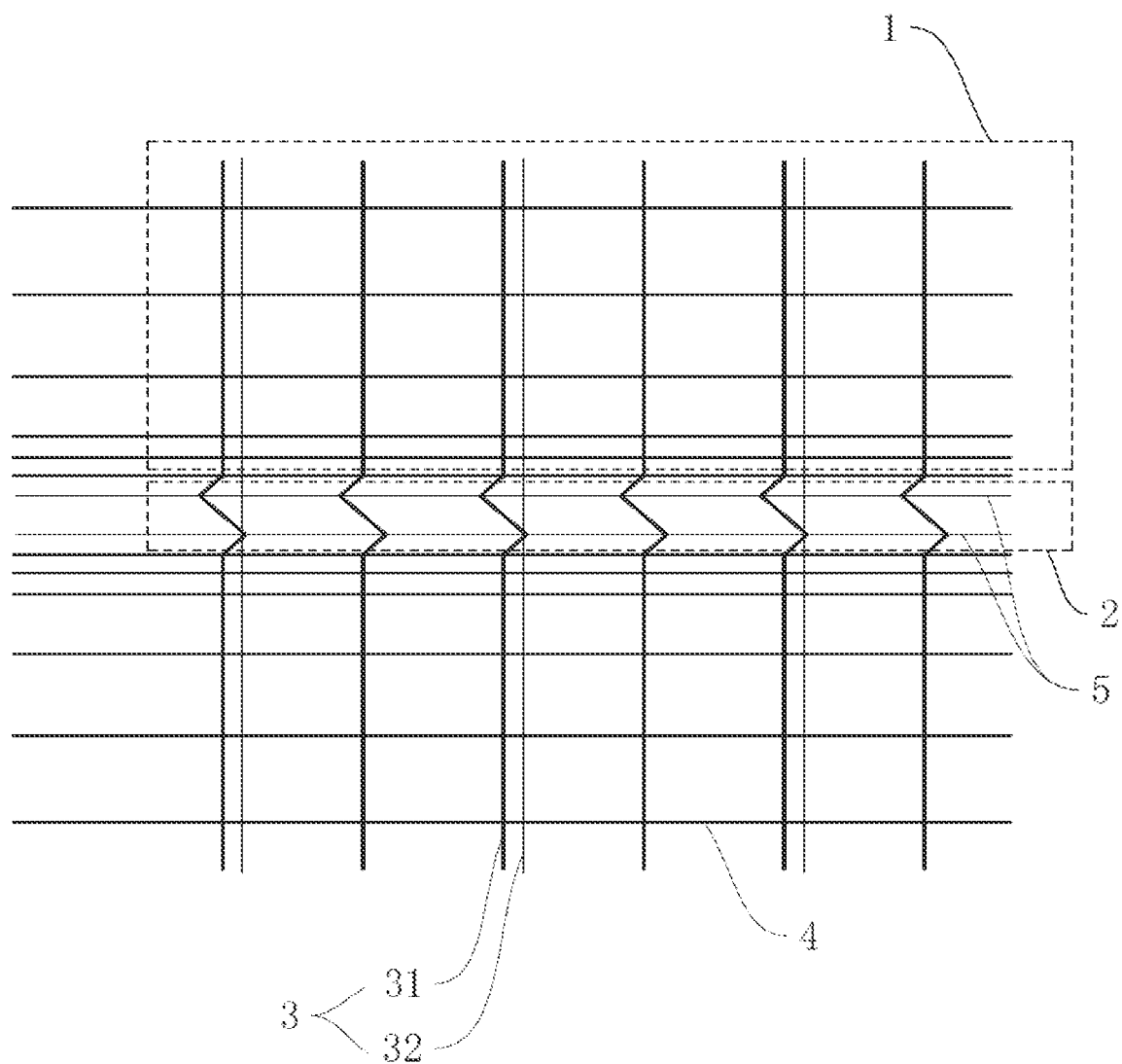
FIG. 5 is a structural schematic of the safety airbag mesh disclosed in the invention (with two weft fiber wires arranged in the reverse direction).

And as shown in FIG. 5, there are two weft fiber wires 5 arranged, but the two weft fiber wires draw the first fibers 31 in opposite directions, making the first fibers 31 take on a broken line formation in the buffer area.

Likewise, those skilled in the art may also arrange a plurality of weft fiber wires or set the direction in which each weft fiber wire draws the first fibers, making the first fibers neatly arranged in the buffer area irrespective of the number of the weft fiber wires arranged or the direction in which the first fibers are drawn.

The above outlines preferable modes of the invention only. Not confined to the preceding embodiments, the scope of protection of the invention covers all technical schemes following the thread of the invention. It should be noted that ordinary skilled persons in the technical field may make a plurality of modifications and rectifications on the principle of the invention. which shall be seen as within the scope of protection of the invention.

The invention claimed is:

1. A safety airbag mesh comprising a fiber layer, the fiber layer comprising a warp fiber unit that extends warpwise and a weft fiber unit that extends weftwise, characterized in that the warp fiber unit comprises a plurality of first fibers and second fibers arranged weftwise, the first fibers warpwise are at least partially located in a buffer area and a support area, and the first fibers in the buffer area take on nonlinear formation, and extend longer than second fibers in the buffer area, the safety airbag mesh further comprises one or more weft fiber wires, the weft fiber wires are arranged in the buffer area, and connected to all the first fibers arranged weftwise in a proper sequence, wherein after deployment of the safety airbag mesh, the one or more weft fiber wires remain connected to the first fibers.

2. The safety airbag mesh of claim 1, wherein the safety airbag mesh comprises one weft fiber wire, the first fibers take on a triangle formation in the buffer area, and a plurality of first fibers are arranged weftwise in a proper sequence in the buffer area.

3. The safety airbag mesh of claim 1, wherein the safety airbag mesh comprises a plurality of weft fiber wires, and the weft fiber wires cause the first fibers to take on a polygonal formation in the buffer area.

4. The safety airbag mesh of claim 1, wherein the weft fiber wire(s) is securely woven together with the first fibers.

5. The safety airbag mesh of claim 1, wherein the weft fiber wire(s) is securely spliced together with the first fibers.

6. The safety airbag mesh of claim 1, wherein the first fibers have greater tensile strength than that of the second fibers and the weft fiber wire.

7. The safety airbag mesh of claim 1, wherein the first fibers comprise two or more bunches of interwoven fibers.

8. The safety airbag mesh of claim 1, wherein the first fibers are made up of at least one of the following materials: aromatic polyamide fibers, polyester fibers, nylon fibers, carbon fibers, and glass fibers.

9. The safety airbag mesh of claim 1, wherein the second fibers are made up of at least one of the following materials: aromatic polyamide fibers, polyester fiber, nylon fibers, carbon fibers and glass fibers.

10. The safety airbag mesh of claim 1, wherein the weft fiber wire is made up of at least one of the following materials: aromatic polyamide fibers, polyester fiber, nylon fibers, carbon fibers or glass fibers.

* * * * *